March 2, 1948. S. W. NEIDORF 2,436,819
METHOD OF FORMING GLASS BEADS
Filed June 23, 1944

INVENTOR.
SAMUEL W. NEIDORF

BY Rebecca Yablonsky

AGENT

Patented Mar. 2, 1948

2,436,819

UNITED STATES PATENT OFFICE 2,436,819

METHOD OF FORMING GLASS BEADS

Samuel W. Neidorf, Nutley, N. J., assignor to Federal Telephone and Radio Corporation, New York, N. Y., a corporation of Delaware Application June 23, 1944, Serial No. 541,768

7 Claims. (Cl. 125—12)

This invention pertains to the transformation of glass elements into segments and has particular reference to a method for cutting glass tubes into beads of desired length.

In the manufacture of electronic discharge tubes, it is usual to seal into the glass envelope, wires which function as electrode supports. For this purpose the wire is surrounded with a glass bead at the sealing portion and upon insertion of the wire and bead thereon into an opening of the envelope the bead is heated to cause it to fuse with an adjacent portion of the envelope. The success of this operation depends to a large extent upon the uniformity of the bead size and shape, and the proper functioning of the discharge tube depends upon freedom of the bead from impurities capable of poisoning the discharge tube atmosphere.

Although glass beads may be cut from tubes by a process of manually filing and then breaking the individual tube, or by cutting it with a cutting tool, such methods are quite time-consuming in that each bead must be cut individually and also wasteful in that a number of beads having chipped or cracked edges are produced which must be discarded. An additional problem arises when it is desired to simultaneously cut a plurality of tubes, since some method must be devised to prevent the slipping of the tubes and to avoid undesirable breakage due to their knocking against each other.

An object of the invention is to provide a method for forming glass beads of uniform size and shape, free from chipped or cracked edges and similar flaws. Another object of the invention is to provide a rapid method for simultaneously cutting a plurality of similar glass elements into smaller units. These objects have been accomplished by surrounding the glass elements with a cementitious material which prevents their slipping and/or vibration, cutting through the elements to form smaller units of desired length, and removing the cementitious material.

The invention will be described in detail in connection with the attached drawings in which.

Figure 1:
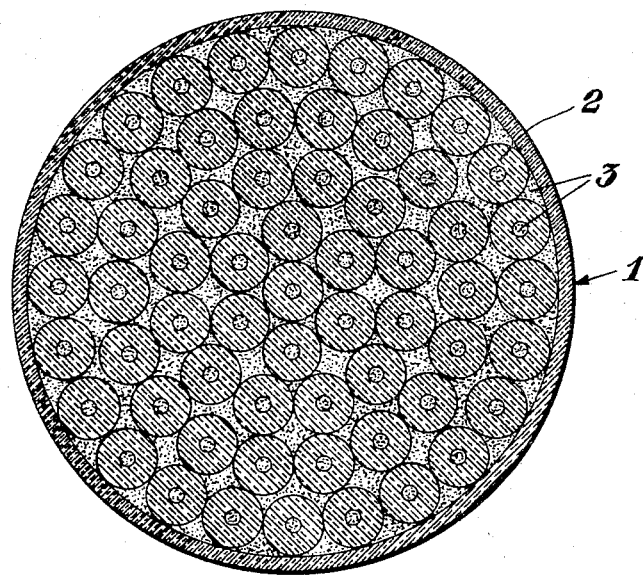
Fig. 1 is a cross-sectional view of a plurality of glass tubes assembled parallelwise in a cylindrical container.
Figure 2:
Fig. 2 is a side view of a glass tube before cutting.

The invention may be conveniently carried out by placing one or more glass elements in a container 1. If several elements, such as tubes 2, are taken, they are formed into a bundle with their long axes parallel to one another. These elements may be of the same or different diameter, as desired. The container 1 is preferably a cylinder open at one end and sealed at the other, in any desired manner (not shown) and is advantageously made of glass to prevent the introduction of foreign matter into the elements during the cutting operation. The ends of the elements are brought in register with the sealed end of the container.

At this stage a cementitious material 3 is introduced into the container 1 and caused to fill up the air spaces thereof. This is conveniently done by melting the cementitious material, pouring it into the container in an amount and in such a manner to fill up the air spaces and solidifying the material. By "cementitious" is meant that the material is such that when it is formed as a solid mass around the surfaces of the elements and between adjacent elements it will prevent their slipping and vibration. The material must itself be easily cut and must be of such a chemical nature that it can readily be removed without the use of agents which will leave impurities in the cut segments. In the preferred embodiment of this invention the cementitious material used is a water-soluble synthetic polymer of waxlike nature commercially known as "Carbowax" and chemically characterized as a high molecular weight polymer of ethylene glycol.

The elements now comprise a compact, rigid mass, owing to the effect of the cementitious material solidly filling the voids thereamong. The operation of cutting into desired lengths is now performed as by means of a suitable abrasive cutting wheel such as a "carborundum" wheel. The wheel is kept cool in any suitable manner. This may be accomplished by passing a stream of cooling fluid over the works of the wheel and the wheel itself; if this is done care must be taken to select a coolant which will not leave foreign matter in the glass elements. It has been found that special advantages are obtained when water is used as the cooling fluid, in conjunction with "Carbowax" as the cementing material. In addition to cooling the wheel, the water also removes any particles of the "Carbowax" adhering thereto by dissolving it. There is thus formed an aqueous solution of "Carbowax" at the surfaces of the wheel which has excellent lubricating properties and improves the cutting action. The moment of time during which the stream of water passes over a transverse face of the mass to be cut, is so short, however, that no appreciable dissolution occurs of the "Carbowax" therein so that the rigidity of the mass is maintained. The container furthermore prevents the water from attacking the said material.

The cementitious material provides a support or cushion for the elements to prevent vibration during the passage of the wheel therethrough and hence to produce segments having smooth, regular edges, free from cracks, chips or similar flaws. If several elements have been used the material also prevents their longitudinal slipping relative to one another, so that the length of the segments can be controlled.

Figure 3:
Fig. 3 is a side view of one cut glass bead.

The cementitious material is then removed from the cut segments as by immersing them in a solvent. It is important that this solvent shall be of such a chemical nature that it in turn can be readily removed from the cut segments, the purpose being to produce segments which are free from any trace of foreign matter. In the preferred embodiment in which a water-soluble waxy material is used, the solvent employed is water because it is the cheapest and leaves no residue. However, the invention is not limited to the use of water-soluble waxes with water as a solvent but contemplates the use of any cementitious material which can be removed without leaving foreign matter in the cut segments. For example, a waxy may be used which is soluble in a volatile solvent such as an alcohol, acetone, benzene or petroleum ether, e. g., paraffin wax, montan wax or the like. An alternative water-soluble material which may be used is a soap of carnauba wax formed by means of an alkaline hydroxide. The solvent containing the dissolved material is then drained off. The cut segments may be washed again with solvent and then are allowed to dry. The finished segments such as the beads 4 (Fig. 3) are uniform in length and have clean, regular, smooth edges. They are then ready for use in any industry or art to which they can be applied, such as to the manufacture of sealing-in wires for electron discharge tubes.

While the invention has been described with particular reference to the transforming of glass tubes into beads for use in electron discharge tubes, this has been done only by way of illustration rather than limitation and it should be apparent that the invention is equally applicable to the forming of smaller units from glass elements of other types.

What I claim is:

1. A method of simultaneously segmenting a plurality of glass tubes into beads comprising assembling the tubes in parallel fashion in a container, introducing into the container a melted water soluble material comprising a high molecular weight polymer of ethylene glycol in sufficient quantity and in such a manner to fill up the air spaces within said container, solidifying said material to form a rigid mass comprising said tubes cemented together by said material, cutting through said rigid mass with an abrasive wheel and at the same time passing a cooling stream of water over said wheel, washing the cut beads with water to remove said material and drying said beads.

2. The method of cutting lengths from glass tubes that comprises setting those parts thereof that lie in the path of a cutting tool in a solid, adherent, soluble cementitious material devoid of frangible characteristics, cutting through the said parts and the said material with a cutting tool, and cooling the edge of the cutting tool with a solvent for the said material.

3. The method of cutting lengths from glass tubes that comprises setting those parts thereof that lie in the path of a cutting tool in a solid, soluble cementitious material, cutting through the said parts and the said material with a cutting tool, and cooling the cutting tool with a solvent for the said material.

4. The method of cutting lengths from glass cylinders that comprises setting those parts thereof that lie in the path of a cutting tool in a solid, water soluble cementitious material, cutting through the said parts and the said material with a cutting tool, and cooling the cutting tool with water.

5. The method of cutting lengths from frangible cylinders that are liable to shatter on cutting that comprises setting those parts thereof that lie in the path of a cutting tool in a solid, soluble cementitious material, cutting through the said parts and the said material with a cutting tool, and cooling the cutting tool with a solvent for the said material.

6. A method of simultaneously segmenting a plurality of glass tubes into beads of uniform size and shape comprising assembling the tubes in parallel fashion in a container, introducing into the container a cementitious material comprising a water-soluble synthetic polymer in sufficient quantity and in such a manner to fill up the air spaces within said container and thereby prevent the slipping and vibration of the tubes, cutting through said mass of material and tubes intermediate the ends thereof to transform said tubes into beads of desired length, washing the cut beads with water to dissolve the cementitious material and to separate the beads from one another and removing the water containing the dissolved material from said beads.

7. A method as set forth in claim 6 in which said material comprises a high molecular weight polymer of ethylene glycol.

SAMUEL W. NEIDORF.

REFERENCES CITED

The following references are of record in the file of this patent:

UNITED STATES PATENTS

| Number | Name | Date |
| --- | --- | --- |
| 2,063,236 | Eisler | Dec. 8, 1936 |
| 450,507 | Dalot | Apr. 14, 1891 |
| 2,328,302 | Simison | Aug. 31, 1943 |
| 1,349,955 | Harwood | Aug. 17, 1920 |